United States Patent

Ichinohe et al.

Patent Number: 5,577,798
Date of Patent: Nov. 26, 1996

[54] SUN-ROOF ASSEMBLY FOR AUTOMOBILES

[75] Inventors: Kazuhiro Ichinohe; Isao Kurihashi, both of Atsugi, Japan

[73] Assignee: Hori Glass Co., Ltd., Japan

[21] Appl. No.: 373,986

[22] Filed: Jan. 18, 1995

[51] Int. Cl.$^6$ ..................................................... B60J 10/12
[52] U.S. Cl. ............................................. 296/216; 49/501
[58] Field of Search ......................... 296/216; 49/493.1, 49/501

[56] References Cited

U.S. PATENT DOCUMENTS 4,891,913   1/1990   Shimura et al. ................... 296/216 X

FOREIGN PATENT DOCUMENTS 6166328   6/1994   Japan .................................... 296/216
2191234  12/1987   United Kingdom ................... 296/216

*Primary Examiner*—Dennis H. Pedder
*Attorney, Agent, or Firm*—Adams & Wilks

[57] ABSTRACT

A sun-roof assembly comprises a transparent member having first and second peripheral edge portions. A first supporting member is connected to the first peripheral edge portion of the transparent member and has a first supporting edge disposed on the first peripheral edge portion of the transparent member, a second supporting edge and a web portion extending from the first and second supporting edges. A second supporting member is connected to the second peripheral edge portion of the transparent member and has first and second supporting edges and an inflated portion disposed between the first and second supporting edges. A connecting member integrally connects the first and second supporting members, the connecting member having a holding portion connected to the web portion of the first supporting member, a spacer portion extending from the holding portion and disposed between the inflated portion of the second supporting member and the second peripheral edge portion of the transparent member, and an abutting portion extending from the holding portion and connected to the second supporting member.

20 Claims, 2 Drawing Sheets

SUN-ROOF ASSEMBLY FOR AUTOMOBILES

FIELD OF THE INVENTION

The present invention relates to a sun-roof assembly for an automobile capable of maintaining a holding frame and a retainer of the sun-roof assembly in a predetermined positional relationship.

DESCRIPTION OF THE PRIOR ART

A sun-roof assembly as shown in FIG. 4 has been heretofore widely used. This sun-roof assembly has a weather strip 3 having soft and elastic properties provided on an outer edge of a window portion 1 to thereby securely eliminate a clearance between the outer periphery of the sun-roof and a vehicle body, thus preventing water leakage and improving airtightness. The outer edge of the window portion 1 is held by a metal retainer 2 and a plastic holder 6 and bonded thereto. A weather strip 3 comprises flanges 14a, 14b mounted and bonded to outer peripheries of the retainer 2 and the holder 6 to thereby keep the beauty of the window portion 1 and to facilitate the assembly.

However, such a conventional sun-roof assembly for an automobile is not provided with a firm locating member for the retainer 2 and the holder 6 relative to the outer edge of the window portion 1. Accordingly, in the state where an adhesive 8 for bonding the holder 6 and the retainer 2 to the window portion 1 is unhardened, the holder 6 is likely to displace relative to the retainer 2, as shown in FIG. 5 by the dashed chain line, after being assembled or even during assembling. As a result, a clearance between flanges 14a and 14b, which are fixed to outer peripheries of the holder 6 and the retainer 2 when the weather strip 3 is mounted, is widened leading to possible disassembly of the sunroof.

The following measure is sometimes taken in order to avoid the drawback noted above. A spacer 7 comprised of an elastic material such as rubber is disposed and bonded between a lower inflated portion 2a of the retainer 2 and the window portion 1 in order to maintain a clearance between the lower inflated portion 2a of the retainer 2 and the window portion 1. However, this suffers from the disadvantage in that the time for assembling the sun-roof is increased.

SUMMARY OF THE INVENTION

It is a primary object of the present invention to provide a sun-roof assembly for an automobile which can maintain a holding frame and a retainer of the sun-roof assembly in a predetermined positional relationship and can prevent a deviation in position of the holding frame and the retainer during or after assembly.

This invention provides a sun-roof assembly for an automobile in which a web portion of a holding frame is inserted into on opening of a stopper which is bonded and secured to a retainer to hold a window portion thereon, thereby preventing the holding frame from deviating relative to the retainer, preventing a weather strip from slipping out and maintaining a clearance between a lower inflated portion of the retainer and the window portion constant.

The sun-roof assembly comprises a portion formed from a transparent member and having first and second peripheral edge portion. A substantially T-shaped holding frame is connected to the first peripheral edge portion of the window portion and has a first supporting edge disposed on the first peripheral edge portion of the transparent member, a second supporting edge and a central convex portion or protrusion extending from the first and second supporting edges. A retainer is connected to the second peripheral edge portion of the window portion and has a first supporting edge, a second supporting edge defining a flange portion and an inflated portion disposed between the first and second supporting edges. A stopper is disposed between the holding frame and the retainer for integrally interconnecting the holding frame and the retainer.

The stopper comprises a holding portion defining an opening for receiving the protrusion of the holding frame, a spacer portion extending from the holding portion and disposed between the inflated portion of the retainer and the second peripheral edge portion of the window portion for maintaining the window portion in fixed spaced relation to the retainer, and an abutting portion extending from the holding portion and inscribed with the flange portion at the second supporting edge of the retainer. The holding portion comprises a base portion bonded to the retainer, and a pair of substantially parallel and spaced apart walls extending from the base portion to define the opening.

In the sun-roof assembly for an automobile according to the present invention, it is possible to maintain the holding frame and the retainer in a predetermined positional relationship by means of the stopper. Therefore, the present invention effectively prevents the position of the holding frame from deviating relative to the retainer during or after assembly of the sun-roof and prevents the weather strip from slipping out. Further, the stopper has a highly stable structure which facilitates mounting of the holding frame, and can be economically manufactured by an extrusion molding process.

DETAILED DESCRIPTION OF THE PREFERRED EMBODIMENT

Figure 4:
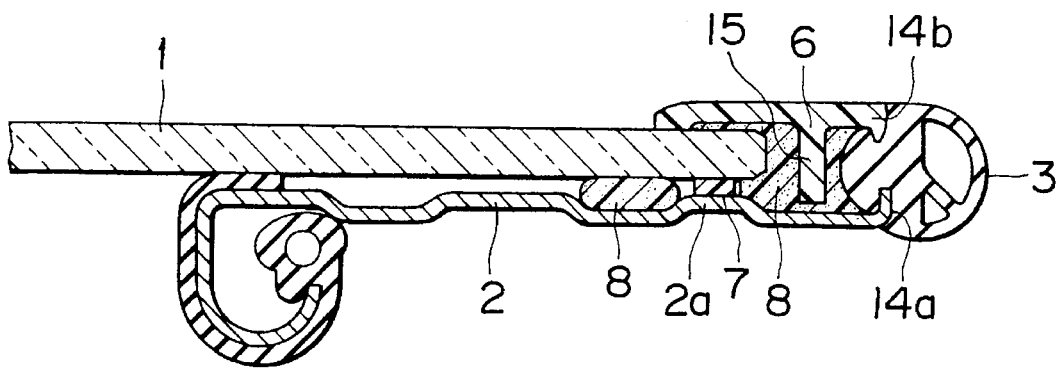
FIG. 4 is a sectional view of a conventional sun-roof assembly for an automobile.
Figure 5:
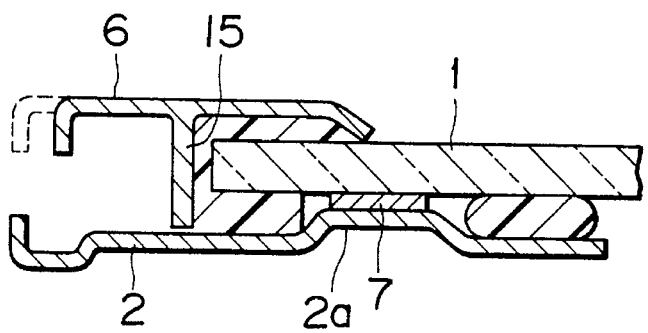
FIG. 5 is a partial sectional view of the conventional sun-roof assembly for an automobile.

An embodiment of the present invention will be described hereinbelow with reference to FIGS. 1 to 3. In these figures, parts which are same as and corresponding to those shown in FIGS. 4 and 5 are indicated by the same reference characters and, therefore, a full description thereof will not be repeated.

Figure 1:
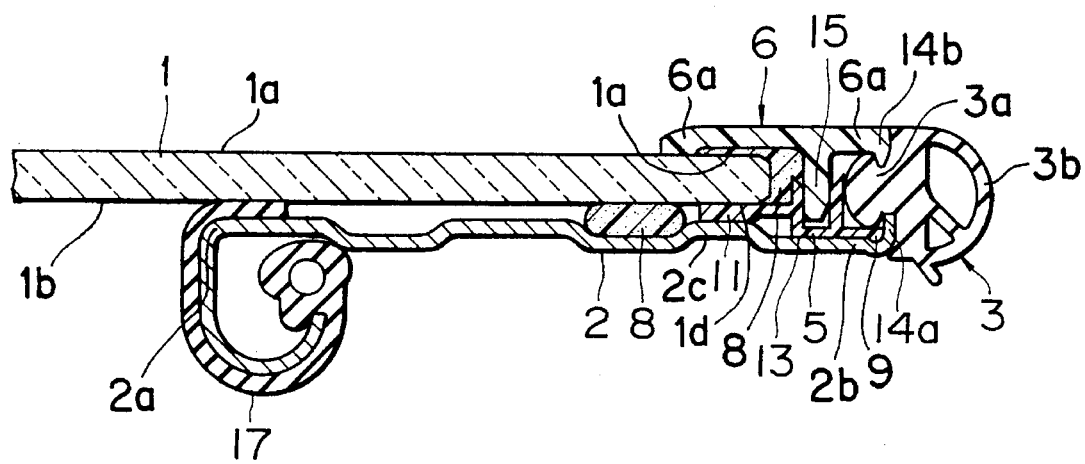
FIG. 1 is a sectional view of a sun-roof assembly for an automobile showing an embodiment of the present invention.
Figure 2:
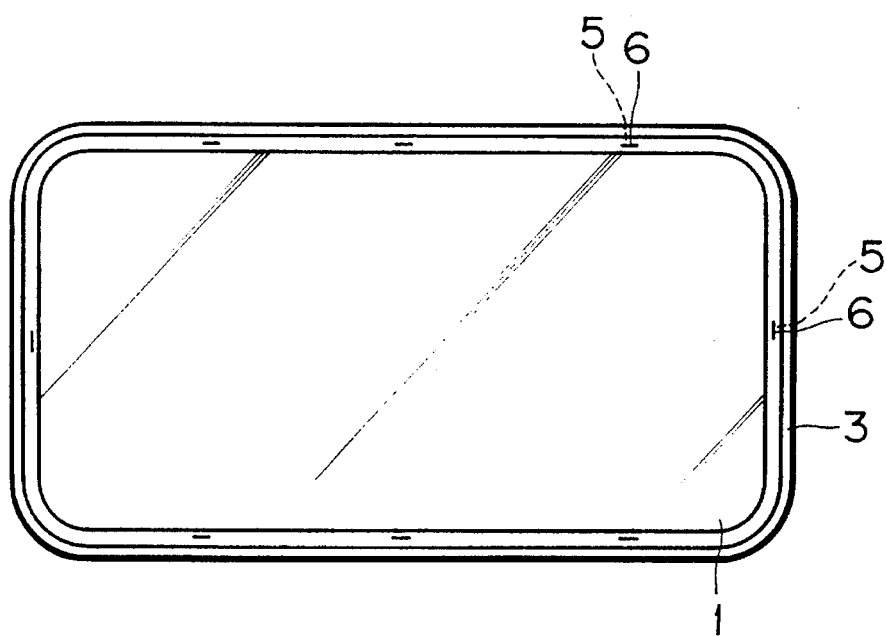
FIG. 2 is a plan view of the sun-roof assembly for an automobile according to the embodiment of the present invention shown in FIG. 1.

Referring to FIGS. 1 and 2, a window portion 1 formed of transparent glass or the like has first and second surfaces 1a,1b terminating, respectively, in first and second peripheral edge portions 1c,1d. A substantially T-shaped first supporting member or holding frame 6 is connected by an adhesive 8 to the first peripheral edge portion of the window portion 1 and has a first supporting edge 6a disposed on the first peripheral edge portion 1a of the window portion 1, a second supporting edge 6b terminating in flange 14b, and a central convex portion or protrusion 15 extending from the first and second supporting edges 6a,6b.

A second supporting member or retainer 2 is connected to the second peripheral edge portion 1b of the window portion 1 by an adhesive 8 and has a first supporting edge 2a, a second supporting edge 2b terminating in flange 14a, and an inflated portion 2c disposed between the first and second supporting edges 2a,2b.

Figure 3:
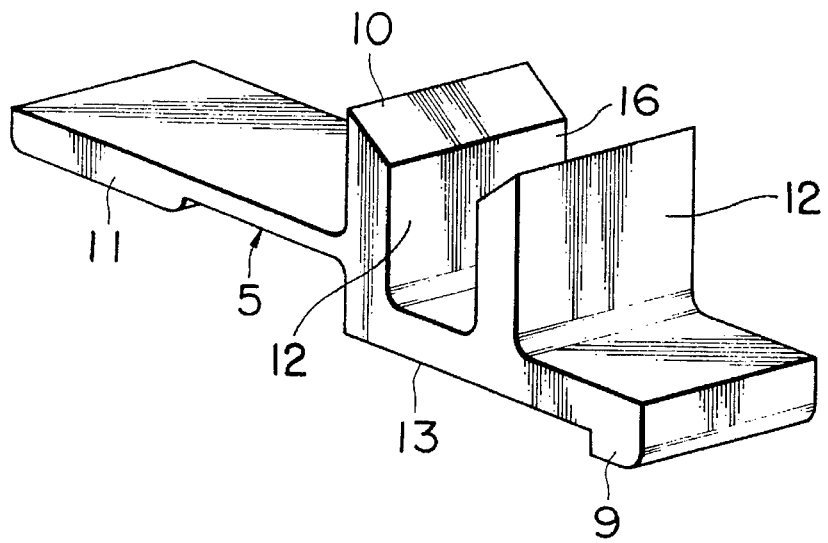
FIG. 3 is a perspective view of the stopper according to the present invention.

Referring to FIGS. 1 and 3, a connecting member or stopper 5 is disposed between the retainer 2 and the holding frame 6 for integrally connecting and maintaining the retainer 2 and the holding frame 6 in a predetermined positional relationship during and after assembly of the sun-roof. The stopper 5 has a holding portion 10 defining a substantially U-shaped opening 16 receiving the protrusion 15 of the holding frame 6, a spacer portion 11 extending from the holding portion 10 and disposed between the inflated portion 2c of the retainer 2 and the second peripheral edge portion 1b of the window portion 1 for maintaining the window portion 1 in fixed spaced relation to the retainer 2, and an abutting portion 9 extending from the holding portion 10 and connected to the flange 14a at the second peripheral edge portion 2b of the retainer 2.

The holding portion 10 of the stopper 5 comprises a base portion 13 bonded to the retainer 2 with a suitable adhesive, and a pair of substantially parallel and spaced apart walls 12 extending from the base portion 13 to define the opening 16. Preferably, the stopper 5 is formed integrally in one-piece of a suitable resin or plastic material by, for example, an extrusion molding process.

A waterproof element or weather strip 3 is mounted to the second supporting edges of the retainer 2 and the holding frame 6 for providing a waterproof seal between the outer periphery of the sun-roof and the body of the vehicle. Specifically, the weather strip 3 a solid base portion 3a and a lip portion 3b protruding outwardly from the solid base portion 3. The solid base portion 3a is fixedly connected to the flanges 14a,14b of the retainer 2 and holding frame 6, respectively, to thereby support the weather strip 3 in place.

An antivibrational element or silencer 17 is secured to the first supporting edge 2a of the retainer 2 for effectively preventing noises resulting from vibrations during operation of the vehicle.

During assembly of the sun-roof, the position of the holding portion 10, and thus the stopper 5, is determined by the connection of the abutting portion 9 with the flange 14a at the second peripheral edge portion 2b of the retainer 2, and is thereafter secured in place by bonding the base portion 13 to the retainer 2. The spacer portion 11 is disposed between the inflated portion 2c of the retainer 2 and the window portion 1 simultaneously with the positioning of the stopper 5. The spacing between the flanges 14a,14b of the retainer 2 and holding frame 6, respectively, is also determined during positioning of the stopper 5 and is maintained constant due to a further reinforcement by the adhesive 8.

By the foregoing construction of the sun-roof assembly according to the present invention, it is possible to maintain the retainer 2 and the holding frame 6 in a predetermined positional relationship by means of the stopper 5. Therefore, the present invention effectively prevents the retainer 2 from displacing relative to the holding frame 6 during or after assembly of the sun-roof and prevents the weather strip 3 from accidentally slipping out of position. Further, the stopper 5 has a highly stable structure which facilitates mounting of the holding frame 6, and can be economically manufactured by an extrusion molding process.

We claim:

1. A sun-roof assembly comprising: a transparent member having first and second peripheral edge portions; a first supporting member connected to the first peripheral edge portion of the transparent member, the first supporting member having a first supporting edge disposed on the first peripheral edge portion of the transparent member and having a second supporting edge and a protrusion extending from the first and second supporting edges; a second supporting member connected to the second peripheral edge portion of the transparent member, the second supporting member having first and second supporting edges and a raised portion disposed between the first and second supporting edges; and a connecting member disposed between the first and second supporting members for integrally connecting the first and second supporting members, the connecting member having a holding portion defining an opening for receiving the protrusion of the first supporting member, a spacer portion extending from the holding portion and disposed between the raised portion of the second supporting member and the second peripheral edge portion of the transparent member for maintaining the transparent member in fixed spaced relation to the second supporting member, and an abutting portion extending from the holding portion and abutting the second supporting member.

2. A sun-roof assembly as claimed in claim 1; wherein the holding portion of the connecting member comprises a base portion disposed on the second supporting member, and a pair of substantially parallel and spaced apart walls extending from the base portion to define the opening.

3. A sun-roof assembly as claimed in claim 2; wherein the connecting member is of one-piece construction.

4. A sun-roof assembly as claimed in claim 3; wherein the connecting member is comprised of a plastic material.

5. A sun-roof assembly as claimed in claim 1; wherein the first supporting member is substantially T-shaped in cross section.

6. A sun-roof assembly as claimed in claim 1; further comprising an antivibrational element supported by the first supporting edge of the second supporting member.

7. A sun-roof assembly as claimed in claim 6; wherein the abutting portion of the connecting member is abutted to the second supporting edge of the second supporting member.

8. A sun-roof assembly as claimed in claim 6; further comprising a waterproof element disposed between the first and second supporting members.

9. A sun-roof assembly as claimed in claim 8; wherein the waterproof element comprises a solid base portion and a lip portion protruding outwardly from the solid base portion, the second supporting edge of each of the first and second supporting members being fixedly connected to the solid base portion of the waterproof element.

10. A sun-roof assembly as claimed in claim 1; wherein the connecting member is of one-piece construction.

11. A sun-roof assembly as claimed in claim 10; wherein the connecting member is comprised of a plastic material.

12. A sun-roof assembly as claimed in claim 1; further comprising a waterproof element disposed between the first and second supporting members.

13. A sun-roof assembly as claimed in claim 12; wherein the waterproof element comprises a solid base portion and a lip portion protruding outwardly from the solid base portion, the second supporting edge of each of the first and second supporting members being fixedly connected to the solid base portion of the waterproof element.

14. A sun-roof assembly comprising: a transparent member having first and second peripheral edge portions; a first supporting member connected to the first peripheral edge portion of the transparent member, the first supporting member having a first supporting edge disposed on the first peripheral edge portion of the transparent member and having a second supporting edge and a protrusion extending from the first and second supporting edges; a second supporting member connected to the second peripheral edge portion of the transparent member, the second supporting member having first and second supporting edges and a raised portion disposed between the first and second supporting edges; a connecting member locating the first and second supporting members relative to each other, the connecting member having a holding portion connected to the protrusion of the first supporting member, a spacer portion extending from the holding portion and disposed between the raised portion of the second supporting member and the second peripheral edge portion of the transparent member, and an abutting portion extending from the holding portion and abutting the second supporting member.

15. A sun-roof assembly as claimed in claim 14; wherein the connecting member is disposed between the first and second supporting members.

16. A sun-roof assembly as claimed in claim 14; wherein the holding portion of the connecting member comprises a base portion disposed on the second supporting member, and a pair of substantially parallel and spaced apart walls extending from the base portion to define an opening receiving the protrusion of the first supporting member.

17. A sun-roof assembly as claimed in claim 16; wherein the connecting member is of one-piece construction.

18. A sun-roof assembly as claimed in claim 17; wherein the connecting member is comprised of a plastic material.

19. A sun-roof assembly as claimed in claim 14; further comprising an antivibrational element supported by the first supporting edge of the second supporting member, and a waterproof element connected to the second supporting edge of each of the first and second supporting members.

20. A sun-roof assembly as claimed in claim 14; wherein the connecting member is of one-piece construction.

\* \* \* \* \*